United States Patent
Rana et al.

(10) Patent No.: US 12,446,722 B2
(45) Date of Patent: Oct. 21, 2025

(54) DISPENSER OF A MACHINE FOR COOKING A DOSE OF PASTA

(71) Applicant: PASTIFICIO RANA S.P.A., San Giovanni Lupatoto (IT)

(72) Inventors: Gian Luca Rana, San Giovanni Lupatoto (IT); Alberto Luigi Cologni, Osio Sopra (IT); Mattia De Santis, Paullo (IT)

(73) Assignee: PASTIFICIO RANA S.P.A. (IT)

( * ) Notice: Subject to any disclaimer, the term of this patent is extended or adjusted under 35 U.S.C. 154(b) by 890 days.

(21) Appl. No.: 17/603,957

(22) PCT Filed: Apr. 16, 2020

(86) PCT No.: PCT/IB2020/053613
§ 371 (c)(1),
(2) Date: Oct. 15, 2021

(87) PCT Pub. No.: WO2020/212907
PCT Pub. Date: Oct. 22, 2020

(65) Prior Publication Data
US 2022/0296028 A1    Sep. 22, 2022

(30) Foreign Application Priority Data
Apr. 16, 2019    (IT) .................. 102019000005916

(51) Int. Cl.
*A47J 27/04*    (2006.01)
*A47J 27/16*    (2006.01)
*A47J 27/00*    (2006.01)

(52) U.S. Cl.
CPC .............. *A47J 27/04* (2013.01); *A47J 27/16* (2013.01); *A47J 2027/006* (2013.01)

(58) Field of Classification Search
CPC ....... A47J 27/04; A47J 27/16; A47J 2027/006
See application file for complete search history.

(56) References Cited

U.S. PATENT DOCUMENTS

| | | | | |
|---|---|---|---|---|
| 4,107,511 A | * | 8/1978 | Shulz ................. | A47J 27/16 219/401 |
| 4,635,812 A | * | 1/1987 | Mueller .............. | A47J 27/16 99/410 |
| 5,442,997 A | * | 8/1995 | Branz ................. | A47J 27/16 99/533 |

(Continued)

FOREIGN PATENT DOCUMENTS

| | | |
|---|---|---|
| EP | 2281493 A1 | 2/2011 |
| JP | 06304067 A  * | 11/1994 |

(Continued)

OTHER PUBLICATIONS

Office Action issued in corresponding Japanese Patent Application No. 2021561788.

*Primary Examiner* — Helena Kosanovic
*Assistant Examiner* — Thao Uyen Tran-Le
(74) *Attorney, Agent, or Firm* — The Belles Group, P.C.

(57) ABSTRACT

A dispenser of a machine for cooking a dose of pasta in a container has a nozzle body, which has at least a first opening in fluidic communication with a steam supply channel and at least a second opening in fluidic communication with a hot water supply channel; and a lid arranged around the nozzle body and configured to close the container.

16 Claims, 2 Drawing Sheets

(56) References Cited

U.S. PATENT DOCUMENTS

| | | | |
|---|---|---|---|
| 6,582,743 B2 * | 6/2003 | Cai .................... | A47J 27/04 |
| | | | 426/511 |
| 2009/0011105 A1 * | 1/2009 | Mahlich ............... | A47J 31/401 |
| | | | 99/323.1 |
| 2009/0266245 A1 * | 10/2009 | Kanuma ................ | G07F 13/10 |
| | | | 99/516 |
| 2011/0256287 A1 * | 10/2011 | Sus ..................... | A47J 31/4489 |
| | | | 99/473 |
| 2011/0266273 A1 * | 11/2011 | Wang ................... | A47J 27/62 |
| | | | 219/438 |
| 2018/0199748 A1 | 7/2018 | Patel | |
| 2018/0360258 A1 * | 12/2018 | Grassia ............... | A47J 31/4489 |

FOREIGN PATENT DOCUMENTS

| | | |
|---|---|---|
| JP | H06304067 A | 11/1994 |
| WO | WO2018/044160 | 3/2018 |

* cited by examiner

DISPENSER OF A MACHINE FOR COOKING A DOSE OF PASTA

CROSS-REFERENCE TO RELATED APPLICATIONS

This Patent Application is a U.S. national stage application under 35 U.S.C. § 371 of PCT Application No. PCT/IB2020/053613, filed on Apr. 16, 2020, which claims priority from Italian Patent Application No. 102019000005916 filed on Apr. 16, 2019, the entire disclosure of the aforementioned priority applications are incorporated herein by reference in their entireties.

TECHNICAL FIELD

The present invention relates to a dispenser of a machine for cooking a dose of food.

In particular, the present invention relates to a dispenser of a machine for cooking a dose of raw pasta in a container, which is configured to be used both in the food service field, for example in a restaurant or in a bar, and at home, without because of this loosing in generality.

BACKGROUND ART

Generally, dispensers used in machines for cooking a dose of food are configured to deliver steam into a container containing the dose of food by means of at least one nozzle arranged in the end part of the dispenser.

Document U.S. Pat. No. 6,582,743 B2 discloses a device for cooking food through steam or hot air or a mixture of steam and hot air.

Documents WO 2018/044160 and US 2018/199748 teach how to cook food inside a container by introducing steam into a container.

Currently known cooking dispensers are not capable of cooking a dose of pasta in the short amounts of time required by the quick-service food field and, at the same time, of ensuring a homogeneous cooking and of preserving the organoleptic qualities of the dose of pasta.

DISCLOSURE OF INVENTION

The object of the present invention is to provide a dispenser that mitigates the drawbacks of the prior art.

According to the present invention there is provided a dispenser of a machine for cooking a dose of pasta in a container, the dispenser comprising a nozzle body, which comprises at least a first opening in fluidic communication with a steam supply channel and at least a second opening in fluidic communication with a hot water supply channel; and a lid arranged around the nozzle body and configured to close the container.

Thanks to the dispenser, steam and hot water can be supplied separately or simultaneously and/or according to any sequence, so as to optimize the times and the quality of cooking of different types of pasta in a substantially closed compartment, where the overpressure of the steam can be maintained.

Furthermore, one single nozzle body with a first opening for the steam and a second opening for the hot water allows the dispenser to be simplified from the constructive point of view.

According to an embodiment, the lid is fixed to the nozzle body.

In this way, the lid can be removed from the machine together with the nozzle body in a simple and quick manner.

According to a further embodiment, the lid is removable from the nozzle body.

In this way, if necessary, the lid can be removed independently of the nozzle body.

In particular, the lid comprises an annular wall, which is configured to be placed in contact with the top edge of the container.

Thanks to the annular wall, the lid is capable of forming, together with the container, a closed compartment, where it is possible to create an overpressure with respect to the outside environment.

In particular, the lid comprises an edge wall configured to be arranged around the container.

In this way, the sealing capacity of the lid is increased.

In particular, the lid comprises a connecting wall, which is configured to be coupled to the nozzle body.

In this way, the lid can be coupled to the nozzle body in an effective manner.

In particular, the nozzle body extends around a longitudinal axis and comprises a central protrusion, which extends downwards along the longitudinal axis and along which said first opening is arranged.

In this way, the steam can be delivered from a defined point of the protrusion.

More in detail, the nozzle body comprises a plurality of first openings distributed along the central protrusion, in particular at least one first opening extends along a respective first axis parallel to the longitudinal axis and the remaining first openings extend along respective first axes inclined with respect to the longitudinal axis.

Thanks to the plurality of first openings, the nozzle body is capable of delivering steam from the central protrusion in a plurality of different directions. In other words, the nozzle body is capable of supplying steam by uniformly distributing it inside the dose of pasta, so as to cook the dose of pasta in a quick and homogeneous manner.

In particular, the nozzle body comprises at least one wall, which extends around the central protrusion and has a plurality of second openings in fluidic communication with the hot water supply channel and are distributed around the longitudinal axis, in particular some second openings extend along respective second axes parallel to the longitudinal axis and other second openings extend along respective second axes inclined with respect to the longitudinal axis.

Thanks to the plurality of second openings, the nozzle body is capable of delivering hot water from the wall extending around the central protrusion in a plurality of different directions. In other words, the nozzle body is capable of supplying hot water by uniformly distributing it above the dose of pasta, so as to allow the dose of pasta to be cooked in a homogeneous manner.

In particular, the dispenser comprises a fixed body, which is fixed to the machine and has the at least one steam supply channel and the at least one hot water supply channel, wherein the fixed body and the nozzle body are shaped and coupled to one another so as to define a first chamber, which is in fluidic communication with the at least one steam supply channel and with the at least one first opening, and a second chamber in fluidic communication with the at least one hot water supply channel and with the at least one second opening, in particular the second chamber extending around the first chamber.

In this way, steam and hot water can be gathered in the first and in the second chamber, respectively, so as to ensure a uniform supply of steam ad hot water, respectively, from the first and the second openings.

In particular, the fixed body has a plurality of hot water supply channels, arranged around one single steam supply channel.

In this way, the first and the second chamber can be supplied in a simple and uniform manner.

In particular, the nozzle body is removable from the fixed body and comprises a cylindrical wall coupled to the fixed body by means of a bayonet connection.

In this way, when the nozzle body needs to be replaced or temporarily removed from the machine, for example to be washed, it can be taken out of the machine, if necessary, in a simple and quick manner, thus avoiding operations with fixing elements, such as screws.

Another object of the present invention is to provide a machine for cooking a dose of pasta, the machine comprising the dispenser as described above and a frame comprising an upper support structure and a lower support structure facing the upper support structure, wherein the dispenser hangs from the upper support structure with the at least one first and said at the least one second opening facing the lower support structure; the lower support structure being configured to support the container.

In this way, hot water and steam can be delivered from the dispenser arranged above the container.

In particular, the lower support structure comprises a guide device, which comprises a supporting wall configured to support the container aligned with the dispenser along the longitudinal axis and movable along the longitudinal axis; and at least one elastic element configured to push the supporting surface upwards.

In this way, it is possible to mechanically control the distance of the container from the upper support structure and to limit the value of the pressure inside the container.

Another object of the present invention is to provide a system for cooking a dose of pasta, the system comprising a machine as described above and a container configured to contain the dose of pasta, accommodate at least partly the nozzle body and stand on the lower support structure.

Thanks to the system, hot water and steam can be separately injected into a container containing a dose of pasta.

In particular, the container and the dispenser are configured in such a way that the at least one first and the at least one second opening are housed inside the container; the at least one first opening being arranged in the dose of pasta and the at least one second opening being arranged above the dose of pasta.

In this way, steam can be delivered into the dose of pasta and, at the same time, hot water can be delivered above the dose of pasta so as to cook the dose of pasta in a quick and homogeneous manner.

In particular, the container comprises a base wall, a lateral wall and a top opening opposite to the base wall and delimited by an edge; the maximum distance between two points belonging to the lateral wall being greater than the distance between the base wall and the edge of the top opening, in particular the maximum distance between two points belonging to the lateral wall being greater than twice the distance between the base wall and the edge of the top opening.

In this way, the hot water and the steam delivered inside the container can be distributed in a uniform manner.

More in detail, the dose of pasta contained inside the container can be wetted with hot water in a homogeneous and widespread manner so as to facilitate the cooking of the dose of pasta.

BRIEF DESCRIPTION OF THE DRAWINGS

Further features and advantages of the present invention will be apparent from the following description of a non-limiting embodiment thereof, with reference to the attached figures, wherein.

BEST MODE FOR CARRYING OUT THE INVENTION

Figure 1:
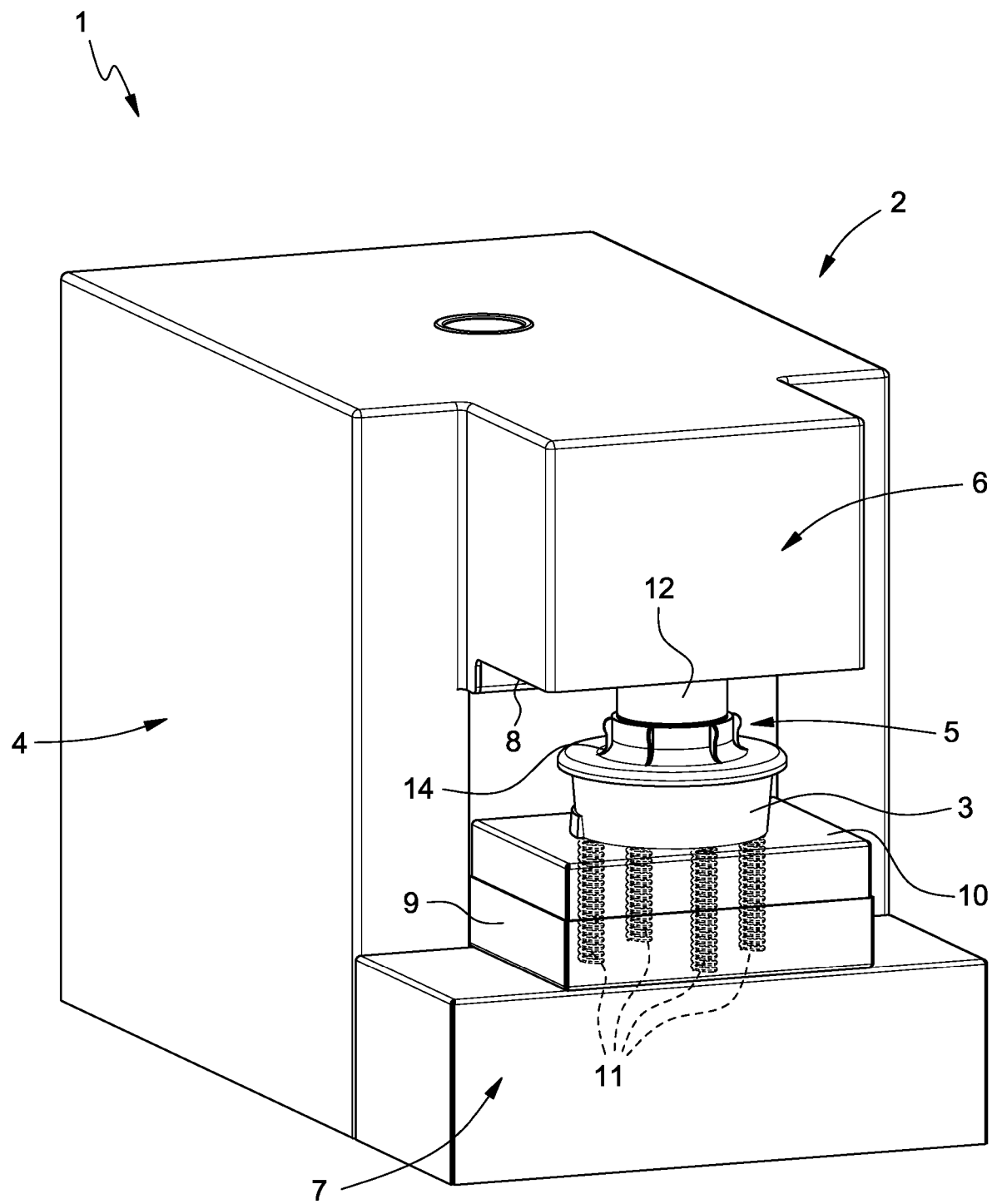
FIG. 1 is a perspective view, with parts removed for clarity, of a system for cooking a dose of pasta according to the present invention.
Figure 2:
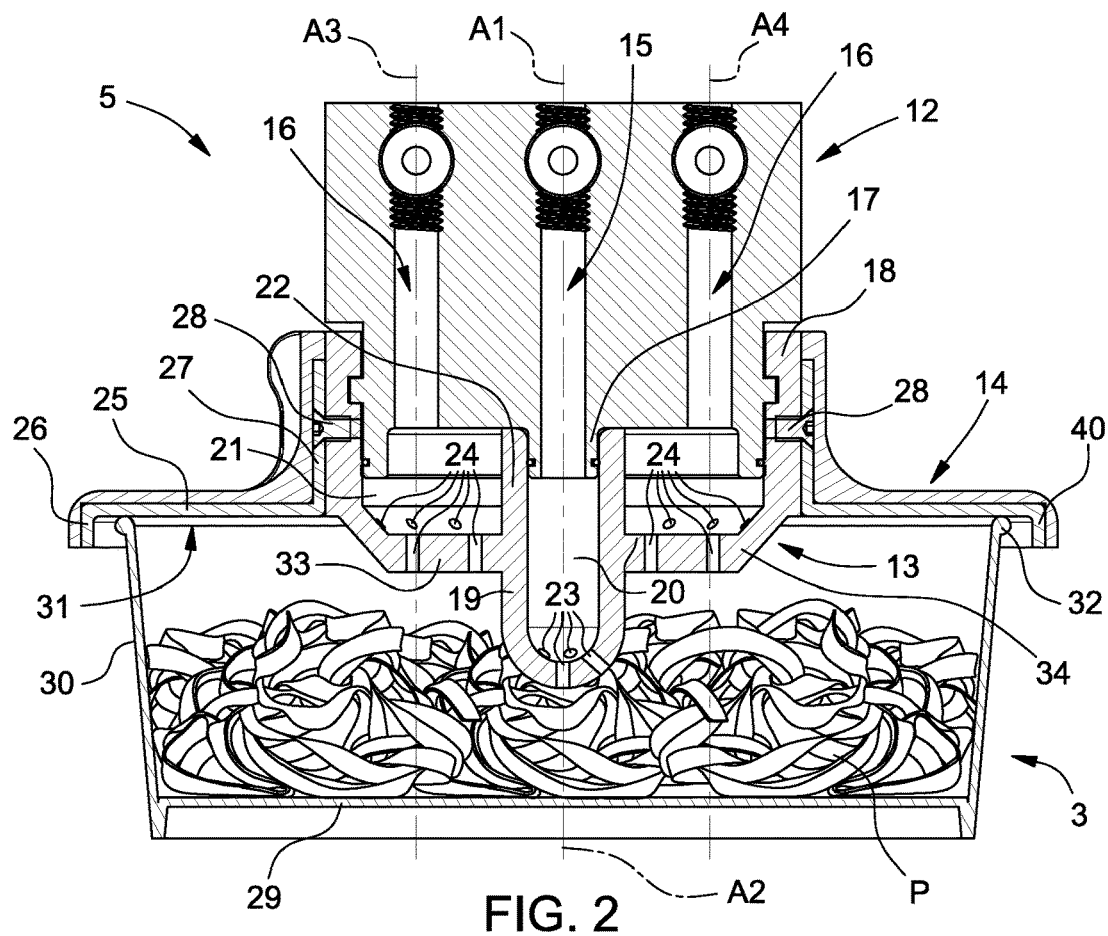
FIG. 2 is a sectional view, with parts removed for clarity, of a dispenser and of a container of the system of FIG. 1 in an operating configuration.

With reference to FIG. 1, number 1 indicates, as a whole, a system for cooking a dose of pasta P (FIG. 2).

The system 1 comprises a machine 2 for cooking a dose of raw pasta P and a container 3 configured to contain the dose of pasta P (FIG. 2).

With reference to FIG. 2, the dose of pasta comprises a plurality of unitary pasta elements arranged inside the container 3 in such a way that there are spaces between the unitary elements, which allow for the circulation of steam and the passage of water.

With reference to FIG. 1, the machine 2 comprises a frame 4 and a dispenser 5. Furthermore, the machine 2 comprises a hot water distribution pipe and a steam distribution pipe (which are not shown in the attached Figures).

The frame 4 comprises an upper support structure 6 and a lower support structure 7 facing the upper support structure 6.

In the example shown in FIG. 1, the upper support structure 6 comprises a lower wall 8, from which the dispenser 5 projects. The lower support structure 7 supports a guide device 9 and a supporting wall 10, which is configured to define a bearing and supporting surface for the container 3 under the dispenser 5.

In particular, the supporting wall 10 is elastically supported so as to allow the supporting wall 10 to translate in a vertical manner. More in detail, the guide device 9 comprises two bodies, which are coupled in a prismatic manner, and at least one elastic element 11, which pushes the supporting wall 10 towards the upper support structure 6. In the example shown in FIG. 1, a plurality of elastic elements 11 are shown.

The dispenser 5 comprises a fixed body 12, which is integral to the machine 2, a nozzle body 13 (FIG. 2) and a lid 14.

With reference to FIG. 2, the dispenser 5 extends along a longitudinal axis A1. The fixed body 12 has a steam supply channel 15, which extends along an axis A2 substantially coinciding with the longitudinal axis A1, and two hot water supply channels 16, which extend along two respective axes A3 and A4 substantially parallel to the longitudinal axis A1 and equally spaced apart from the axis A1.

The fixed body 12 has an appendage 17 comprising a cylindrical wall, which is configured to be coupled to the nozzle body 13 and to delimit the end part of the steam supply channel 15.

The steam supply channel 15 is hydraulically connected to the steam distribution pipe, which is not shown in the attached Figures, and the hot water supply channels 16 are hydraulically connected to the hot water distribution pipe, which is not shown in the attached Figures.

The nozzle body 13 develops around the longitudinal axis A1 and comprises a cylindrical wall 18, which is shaped so as to be coupled to the fixed body 12 in a removable manner by means of a bayonet coupling.

The nozzle body 13 comprises a central protrusion 19, which extends along the longitudinal axis A1.

The fixed body 12 and the nozzle body 13 are coupled so as to form a central chamber 20 in fluidic communication with the steam supply channel 15, and a chamber 21 arranged around the chamber 20 in fluidic communication with the two hot water supply channels 16.

In particular, the nozzle body 13 comprises an inner cylindrical wall 22 arranged around the appendage 17, which builds an extension of the central protrusion 19, is coupled to the appendage 17 and separates the chamber 20 from the chamber 21 in a hydraulically sealed manner.

The nozzle body 13 comprises a plurality of openings for feeding steam into the container 3, which are distributed along the central protrusion 19 and extend along respective axes.

In particular, at least one opening 23 arranged along the longitudinal axis A1 and in correspondence of the lower end of the central protrusion 19 extends along a respective axis parallel to the longitudinal axis A1, whereas the remaining openings 23 extend around the longitudinal axis A1 along respective axes inclined with respect to the longitudinal axis A1.

The plurality of openings 23 hydraulically connect the chamber 20 and the container 3.

Furthermore, the nozzle body 13 comprises a wall 33 and a wall 34, which extend around the central protrusion and have a plurality of openings 24 for feeding hot water into the container 3.

In particular, some openings 24 extend along respective axes parallel to the longitudinal axis A1 and the other openings 24 extend along respective axes inclined with respect to the longitudinal axis A1.

The plurality of openings 24 hydraulically connect the chamber 21 and the container 3.

The lid 14 is arranged around the nozzle body 13 and is configured to close the container 3. In other words, the dispenser 5 and the container 3 are coupled so as to form a substantially closed compartment, which contains the dose of pasta P.

In particular, the lid 14 comprises an annular wall 25, which is flat and is configured to be placed in contact with the edge of the container 3; an edge wall 26, which is configured to be placed around the container 3; and a connecting wall 27, which is substantially cylindrical and is configured to be coupled to the nozzle body 13.

Furthermore, the lid 14 is coupled to the nozzle body by means of fixing elements 28 and, therefore, can selectively be removed from the nozzle body 13.

In a variant of the invention, which is not shown in the attached Figures, the lid 14 is fixed to the nozzle body 13 in an integral manner.

The container 3 comprises a base wall 29, a lateral wall 30 and a top opening 31, which is opposite to the base wall 29 and is delimited by an edge 32; wherein the maximum distance between two points belonging to the lateral wall along the base wall 29 is greater than the distance between the base wall 29 and the edge 32 of the top opening 31.

In the example shown in FIG. 2, the container 3 has a base wall 29 with a circular shape and a slightly flared lateral wall 30. In this configuration, the diameter of the base wall 29 is greater than twice the distance between the base wall 29 and the edge 32 of the top opening 31.

Figure 3:
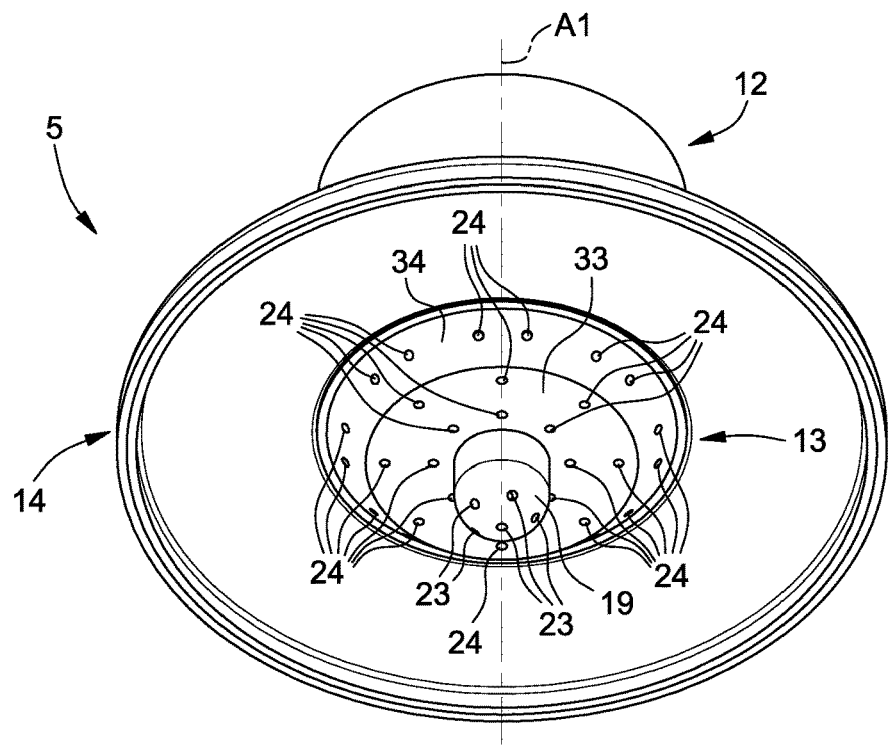
FIG. 3 is a perspective view, with parts removed for clarity, of the dispenser of FIG. 2.

With reference to FIG. 3, the distribution of the openings 23 and 24 of the nozzle body 13 can be clearly seen.

In particular, the openings 23 are distributed around the longitudinal axis A1, in the area of the end of the central protrusion 19.

The openings 24 having an axis that is parallel to the longitudinal axis A1 are arranged around the longitudinal axis A1, along a wall 33 adjacent to the central protrusion 19.

The openings 24 having an axis inclined with respect to the longitudinal axis A1 are arranged around the longitudinal axis A1, along an inclined wall 34 adjacent to the wall 33 and to the wall 18.

In use, with reference to FIG. 2, the steam is conveyed from the steam distribution pipe, at a given pressure which is controlled by the machine 2, to the steam supply channel 15 and the hot water is conveyed from the water distribution pipe, at a temperature and at a pressure which are controlled by the machine 2, to the hot water supply channels 16.

Subsequently, the steam flows from the steam supply channel 15 to the chamber 20 and the hot water flows from the hot water supply channels 16 to the chamber 21.

The openings 23 hydraulically connect the chamber 20 and the inside of the container 3 and deliver steam in different directions, thus uniformly distributing it inside the dose of pasta P contained in the container 3.

The openings 24 hydraulically connect the chamber 21 and the inside of the container 3 and deliver hot water in different directions, thus uniformly distributing it above the dose of pasta P contained in the container 3.

The configuration of the dispenser 5 allows steam to be directly delivered into the dose of pasta P, whereas the hot water is distributed in a rain-like manner above the dose of pasta P. Thanks to the fact that the dose of pasta P consists of unitary elements defining spaces, the steam can freely circulate in the dose of pasta P and comes into contact with the unitary elements. Similarly, the hot water flows so as to permeate all the unitary elements of the dose of pasta P in a uniform manner.

The delivery of steam and hot water into the container 3 can take place simultaneously or according to any other time sequence.

The lid 14 closes the container 3 covering the top opening 31 together with the nozzle body 13 and allows to keep an overpressure with respect to the outside environment on the inside of the container 3.

With reference to FIG. 1, in use, the overpressure on the inside of the container 3 is mechanically controlled and limited. In detail, the force exerted by the pressure of the steam pushes the container 3 and the supporting wall 10 downwards and is contrary to the upward force exerted by the elastic element 11 upon the supporting wall 10.

In particular, as the pressure on the inside of the container 3 increases, the force exerted upon the supporting wall 10, upon the lid 14 and upon the nozzle body 13 increases. When the pressure of the steam exceeds a predefined value, it moves the supporting wall 10 downwards, thus creating, between the edge 32 of the container 3 and the lid 14, a slit, from which steam at an overpressure with respect to the outside environment escapes, reducing the value of the pressure inside the container 3.

As the value of the pressure on the inside of the container 3 decreases, the upward force exerted by the elastic element 11 upon the supporting wall 10 tends to close said slit, thus restoring the contact between the edge 32 of the container 3 and the lid 14.

In other words, the guide device 9, besides facilitating the insertion and the extraction of the container 3, allows to reduce the pressure of the steam in the container 3, in case said pressure is too high.

It is evident that variations can be made to the present invention without departing from the scope of protection set forth in the appended claims.

The invention claimed is:

1. A dispenser of a machine for cooking a dose of pasta in a container, the dispenser comprising a nozzle body, which comprises at least a first opening in fluidic communication with a steam supply channel and at least a second opening in fluidic communication with a hot water supply channel; a lid arranged around the nozzle body and configured to close the container; and a fixed body, which is fixed to the machine and has the steam supply channel and the hot water supply channel, in which the fixed body and the nozzle body are shaped and reciprocally coupled so as to define a first chamber in fluidic communication with the steam supply channel and with the at least one first opening, and a second chamber in fluidic communication with the hot water supply channel and with the at least one second opening.

2. The dispenser as claimed in claim 1, wherein the lid is fixed to the nozzle body.

3. The dispenser as claimed in claim 1, wherein the lid is removable from the nozzle body.

4. The dispenser as claimed in claim 1, wherein the lid comprises an annular wall, which is configured to be placed in contact with a top edge of the container.

5. The dispenser as claimed in claim 4, wherein the lid comprises an edge wall configured to be arranged around the container.

6. The dispenser as claimed in claim 4, wherein the lid comprises a connecting wall, configured to be coupled with the nozzle body.

7. The dispenser as claimed in claim 1, wherein the nozzle body comprises a plurality of first openings distributed along a central protrusion, at least one first opening extends along a respective first axis parallel to a longitudinal axis and remaining first openings extend along respective first axes inclined with respect to the longitudinal axis.

8. The dispenser as claimed in claim 1, wherein some second openings extend along respective second axes parallel to a longitudinal axis and other second openings extend along respective second axes inclined with respect to the longitudinal axis.

9. The dispenser as claimed in claim 8, wherein the nozzle body is removable from the fixed body and comprises a cylindrical wall coupled to the fixed body by a bayonet connection.

10. The dispenser as claimed in claim 1, wherein the fixed body has a plurality of hot water supply channels, arranged around one single steam supply channel.

11. The machine for cooking a dose of pasta in the container, the machine comprising the dispenser as claimed in claim 1, and a frame comprising an upper support structure and a lower support structure facing the upper support structure; wherein the dispenser is hung from the upper support structure with the at least first opening and the at least second opening facing the lower support structure; the lower support structure being configured to support the container.

12. The machine as claimed in claim 11, wherein the lower support structure comprises a guide device, which comprises a supporting wall configured to support the container aligned with the dispenser along the longitudinal axis and movable along the longitudinal axis; and at least one elastic element configured to push the supporting wall upwards.

13. A system for cooking a dose of pasta, the system comprising the machine as claimed in claim 11, and the container configured to contain the dose of pasta, accommodate at least in part the nozzle body, and stand on the lower support structure.

14. The system as claimed in claim 13, wherein the container and the dispenser are configured in such a way that the at least first opening and the at least second opening are housed inside the container; the at least first opening being arranged in the dose of pasta and the at least second opening being arranged above the dose of pasta.

15. The system as claimed in claim 13, wherein the container comprises a base wall, a lateral wall and a top opening opposite to the base wall and bounded by an edge; a maximum distance between two points belonging to the lateral wall being greater than a distance between the base wall and the edge of the top opening, in particular the maximum distance between two points belonging to the lateral wall being greater than twice the distance between the base wall and the edge of the top opening.

16. The dispenser as claimed in claim 1, wherein the nozzle body extends around a longitudinal axis and comprises a central protrusion that extends along the longitudinal axis downwards and along which is arranged the first opening.

* * * * *